United States Patent [19]
Suzuki

[11] Patent Number: 5,291,512
[45] Date of Patent: Mar. 1, 1994

[54] BRAGG REFLECTOR FOR MICROWAVE AND FAR-INFRARED WAVE, AND FREE ELECTRON LASER PROVIDED WITH THE REFLECTOR

[75] Inventor: Yoshinori Suzuki, Tokyo, Japan

[73] Assignee: NEC Corporation, Tokyo, Japan

[21] Appl. No.: 890,121

[22] Filed: May 29, 1992

[30] Foreign Application Priority Data

May 31, 1991 [JP] Japan .................. 3-155339

[51] Int. Cl.$^5$ .............................. H01S 3/08
[52] U.S. Cl. .............................. 372/99; 372/2; 372/82; 372/69; 372/96
[58] Field of Search .............. 372/2, 99, 96, 69, 82

[56] References Cited

U.S. PATENT DOCUMENTS

| | | | |
|---|---|---|---|
| 4,697,272 | 9/1987 | Harvey | 372/2 |
| 4,745,617 | 5/1988 | Harvey | 372/99 |
| 4,888,776 | 12/1989 | Dolezal et al. | 372/2 |

*Primary Examiner*—Léon Scott, Jr.
*Attorney, Agent, or Firm*—Sughrue, Mion, Zinn, Macpeak & Seas

[57] ABSTRACT

A Bragg reflector for selecting a specific spectral line from an output of a free electron laser (FEL) driven in the Raman regime to feed back the spectral line to the FEL. The Bragg reflector comprises at least one reflector pipe (4A), and a plurality of ring-formed plates (8) with their outer peripheries fitted to the inner periphery of the reflector pipe. The plurality of the ring-formed plates are spaced apart from each other at a constant spacing prescribed so that the alignment of the ring-formed plates provide the Bragg reflection of microwaves or far-infrared waves of a prescribed wavelength.

8 Claims, 10 Drawing Sheets

ACTIVE LAYER

CLAD LAYER

BRAGG REFLECTOR FOR MICROWAVE AND FAR-INFRARED WAVE, AND FREE ELECTRON LASER PROVIDED WITH THE REFLECTOR

BACKGROUND OF THE INVENTION

Field of the Invention

The present invention relates to an apparatus for generating a spectral line of a narrow line width of a microwave or a far-infrared wave emitted in particular from a free electron laser driven in the Raman regime.

Description of the Related Art

In order to create a sharp spectral line, a Fabry-Perot resonator has been widely used in a low-power laser. The resonance condition of the Fabry-Perot Resonator is, as known well, $$4d/\lambda = 2q + (1+m+n), \quad (1)$$

where $\lambda$ and d represent a resonance wave length and a distance between centers of two mirrors disposed face to face, respectively, q stands for the number of nodes of a standing wave produced longitudinally (in the direction connecting the centers of the mirrors) between the two mirrors, and m and n stand for the numbers of nodes of standing waves produced two-dimensionally in the plane perpendicular to the longitudinal direction. Since q is generally large enough to render m, n and 1 negligible, it follows from equation (1) that $$\lambda = 2d/q, \quad (2)$$

hence the resonance frequency is $$f = [c/(2d)]q, \quad (3)$$

where c denotes the velocity of the light wave. It follows from equation (3) that the frequency difference for $\Delta q = 1$ is $$\Delta f = c/(2d). \quad (4)$$

For example, let c be $3 \times 10^8$ [m/sec] and d be 1 [m], then $\Delta f$ is approximately 150 [MHz]. Accordingly, a laser output of 450 [MHz] line width can be separated into $450/150 = 3$ longitudinal mode lines.

Another typical example of a low-power laser is the distributed feedback (DFB) laser. This laser is based on a concept of selecting a specific wavelength different from the Fabry-Perot resonator. In the DFB laser, a specific wavelength is selected by means of a diffraction grating as shown in FIG. 1. Periodical grooves of the grating are formed in a clad layer over or under an active layer of an opto-electronic IC by the photolithography method.

A light wave incident along the active layer is partly reflected at the boundary surface of the groove where the refractive index varies discontinuously, and partly transmitted through the boundary surface by the quantum mechanical tunnel effect, thus repeating reflection and transmission successively. The light waves reflected from all the boundary surfaces are intensified when they are in phase. This reflection is called the Bragg reflection, and the condition for the reflected light waves to be in phase is called the Bragg condition. The Bragg-reflected light is incident on a mirror provided at the ends of the active layer and is reflected from the mirror back into the active layer, thus contributing to the stimulated emission in the active layer. The Bragg condition for the backward reflection is $$d = m(\lambda/n_r) \cdot (\tfrac{1}{2}), \quad (5)$$

where d stands for the grating constant, or the period of the grooves, $\lambda/n_r$ stands for the wavelength in an optical medium of an refractive index $n_r$ and m denotes positive integers, 1, 2, —, which represent the orders of the Bragg reflection.

Next, a brief explanation of a free electron laser which is our present concern will be given.

A typical free electron laser (FEL) is provided by injecting a high energy electron beam emitted from an accelerator, e.g. a linac, into a magnetic field produced by a so-called helical wiggler. The magnetic field induces a ponderomotive force longitudinally acting on the electron beam, thus generating electron density modulation in the electron beam. As a result, a space-charge wave is generated in the electron beam. The wavelength of the space-charge wave depends on both the energy of the incident electron beam and the pitch of the helical wiggler. Accordingly, the wavelength can be selected at any desired value by adjusting these parameters.

It has been known that, when the wavelength of the space-charge wave is selected to be longer than the Debye length, the space-charge wave is retained without decay, and a stationary state of the space-charge wave is established. In this state, the electrons behave collectively as an electron ensemble rather than as individual electrons. The electron ensemble emits or absorbs an electromagnetic wave corresponding to a transition between two quantum states defined in accordance with the collective model. The way of the collective behavior of the electron ensemble is called in the art the Raman regime. The wavelength of the electromagnetic wave emitted or absorbed by the electron ensemble driven in the Raman regime is typically the order of 0.1–1 mm. It should be noted that although an emission of the electromagnetic wave in the Raman regime is basically a spontaneous emission, electrons emit electromagnetic waves in phase, provided that the electrons moves coherently under strong correlation as is the case in the electron ensemble in the Raman regime. This phenomenon is known in the art as the superradiant emission. Due to the superradiant emission, FEL can emit coherent electromagnetic waves in the Raman regime.

Although FEL provides coherent electromagnetic waves, the problem encountered has been that, since the coherence does not result from the quantum mechanical resonance, i.e. from the stimulated emission, the spectral line width of the emitted electromagnetic wave usually is approximately ten times wider than that of the ordinary laser. It is difficult, however, to employ the Fabry-Perot resonator to solve this problem in cases when a high-power laser output is required, because the high-power microwave output of FEL will thermally damage the mirrors of the resonator, thereby deteriorating it. Further, it is obviously impossible to provide the Bragg reflector inside a FEL in such a manner as it is provided inside the semiconductor laser described above.

SUMMARY OF THE INVENTION

It is an object of the present invention to provide a Bragg reflector for a microwave and a far-infrared wave.

It is another object of the present invention to provide a free electron laser of a narrowed spectral line width.

In order to attain the first object above, the Bragg reflector according to the present invention comprises at least one pipe, and a plurality of ring-formed plates with their outer peripheries fitted to the inner periphery of the at least one pipe, the plurality of ring-formed plates being spaced apart from each other at a constant spacing prescribed so that the alignment of the ring-formed plates provides the Bragg reflection of electromagnetic waves of a prescribed wavelength.

Hereafter said one pipe is referred to as a reflector pipe. The ring-formed plates constitutes a one-dimensional lattice with each plate as a lattice point aligned in the direction of the axis of the reflector pipe at an interval of said constant spacing (the lattice constant)

The electromagnetic waves incident to the reflector pipe diffract, and the diffracted waves impinge on the regularly disposed ring-formed plates and are scattered there. When the scattered waves are in phase, the Bragg reflection takes place. It should be noted that, when the ring-formed plates are made of metal, the electromagnetic wave of the present concern does not transmit through the metal ring plate, which is unlike the Bragg reflection in the semiconductor laser. The reason for this is that the skin depth for the electromagnetic-wave frequency is the order of 1 $\mu$m or less, which is far less than the thickness of the metal ring plate.

The Bragg condition for the backward reflection is given to be $$d = m\lambda/2, \tag{6}$$

where d, m and $\lambda$ stand for the lattice constant (the spacing between the adjacent ring-formed plates), an order of the Bragg reflection and the wavelength of the incident electromagnetic wave, respectively, and the refractive index in the reflector pipe is taken to be 1. It follows from equation (6) that $$\Delta d = \Delta \lambda / 2 \tag{7}$$

for m = 1, where $\Delta d$ and $\Delta \lambda$ represent an error in the lattice constant caused by a positional error of the ring-formed plate and a spectral line width of the first order bragg reflection caused by error $\Delta d$, respectively. If $\Delta d = 0.1$ mm, and d = 1 mm, then the spectral line width ratio $\Delta \lambda / \lambda$ is the order of 10%. Since it is possible to minimize an error in positioning of the ring-formed plate to 0.1 mm without difficulty by machine work, the Bragg reflector of the present invention is capable of selecting a spectral line within the spectral line width ratio of approximately 10% without difficulty from the incident electromagnetic waves.

A similar argument holds for the spectral line width caused by the thickness of the ring-formed plate. Since the diffracted electromagnetic wave can be scattered at any point on the plate, the position of the scattering center can vary to the extent of the thickness of the ring-formed plate. Therefore, let $\Delta d$ be the thickness, then it follows from equations (6) and (7) that $$\Delta d = (\Delta \lambda / \lambda) \cdot d. \tag{8}$$

Thus, when the spectral line width ratio is designed to be a given value $\alpha$, it is preferable to design the thickness of the ring-formed plate to be less than the product of the spectral line width ratio $\alpha$ and lattice constant d.

In order to use the Bragg reflector for high-power electromagnetic waves, the ring-formed plates are preferably heat-resistant in the sense that the plate is free from thermal deformation and has a low thermal expansion coefficient. The reason for this is that it is necessary to prevent the spectral line width of the Bragg-reflected beam from widening caused by thermal deformation and thermal expansion. Such widening is apt to take place when the incident electromagnetic waves are of high power.

The incident electromagnetic waves preferably are an output of a free electron laser driven in the Raman regime.

The reason for this is that a free electron laser, when driven in the Raman regime, is in the superradiant state, and thus emits coherent electromagnetic waves.

In order to attain the second object of the present invention, the free electron laser of the present invention comprises a free electron laser source driven in the Raman regime and the Bragg reflector provided in accordance with the first-stated object of the invention, wherein the output of the free electron laser source is supplied to the Bragg reflector, and a backwards Bragg-reflected beam produced by the Bragg reflector is fed back to the free electron laser source.

Since the backwards Bragg-reflected beam is fed back in order to cause stimulated emission, the free electron laser is capable of providing a narrowed spectral line with a spectral line width ratio nearly the same as that of the Bragg reflector.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

With reference now to the drawings, a preferred embodiment of the present invention will be given below.

Figure 1:
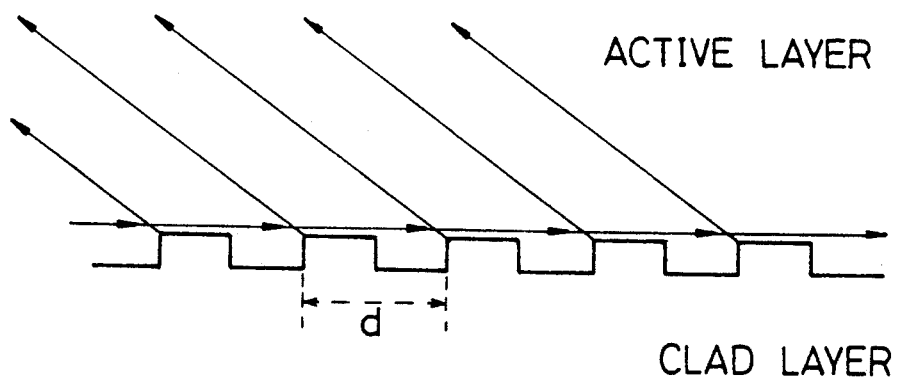
FIG. 1 illustrates a prior art diffraction grating formed in an opto-electronic IC.
Figure 2:
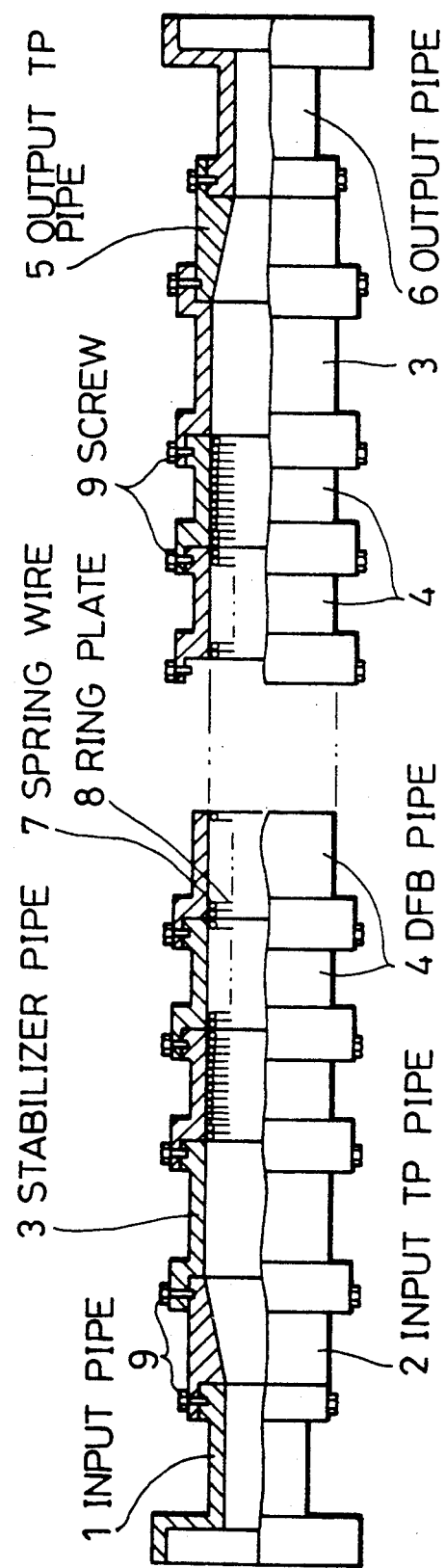
FIG. 2 shows a cross-sectional view of an embodiment of the Bragg reflector according to the present invention.
Figure 3:
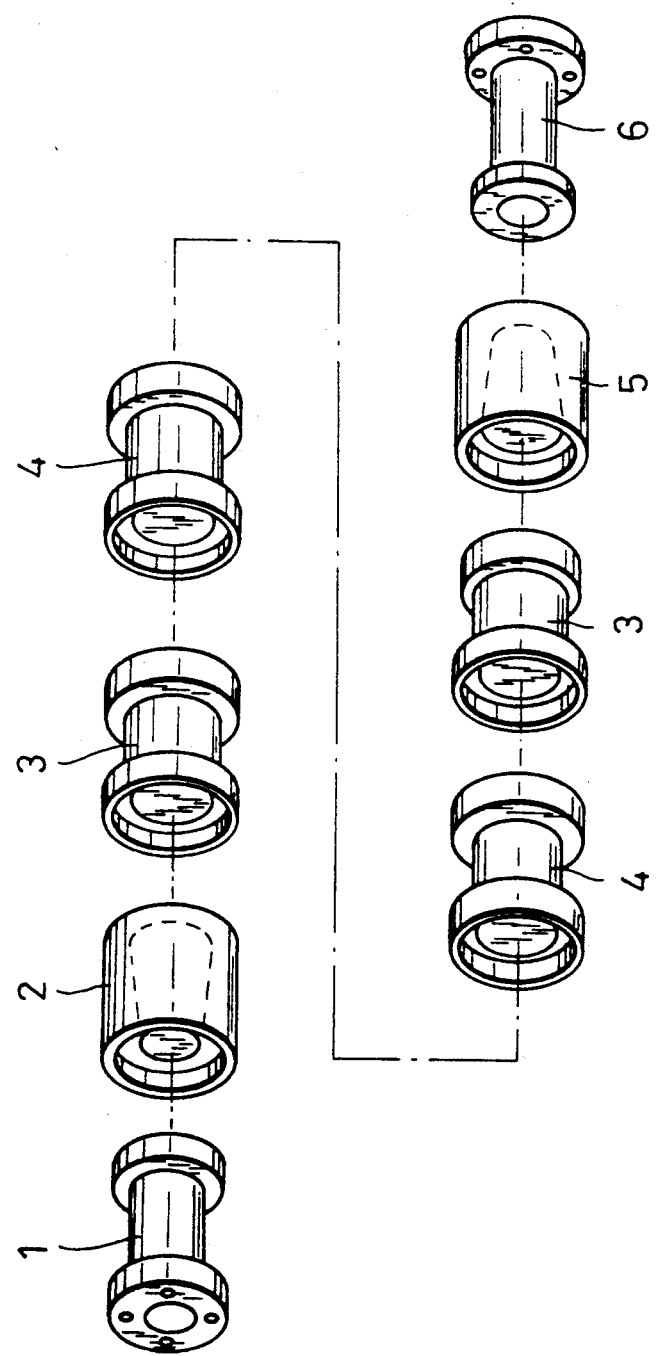
FIG. 3 shows a schematic diagram of the partial exploded perspective view of the Bragg reflector shown in FIG. 2.

FIG. 2 shows a cross-sectional view of an embodiment of the Bragg reflector according to the present invention, and FIG. 3 shows a schematic diagram of the partial exploded perspective view of the Bragg reflector shown in FIG. 2.

The Bragg-reflector is composed of input pipe 1, input TP (Taper) pipe 2, stabilizer pipe 3, DFB (Distributed Feedback) pipes 4, output TP pipe 5 and output pipe 6. All these pipes are made of stainless steel of low thermal conductivity and mechanically interconnected by making use of screws 9 with their longitudinal axes aligned along the optical axis of the Bragg reflector. Input pipe 1 is supplied with an output of a high-power high-current free electron laser (FEL) driven in the Raman regime. (The FEL is not shown in the figure.) Hereafter, the high-power output of FEL is referred to as HPL. Input TP pipe 2 has a gradually increasing inner diameter, the inner diameters at both ends of input TP pipe 2 being equal to the inner diameters of input pipe 1 and stabilizer pipe 3, respectively. In this way, the inside walls of input pipe 1 and stabilizer pipe 3 are smoothly connected through input TP pipe 2, whereby irregular reflection of an electromagnetic wave on the inside wall is avoided. Output TP pipe 5 and output pipe 6 are the same in structure as input TP pipe 2 and input pipe 1 respectively, except that the input side and the output side are reversed as shown in FIG. 2.

Figure 4:
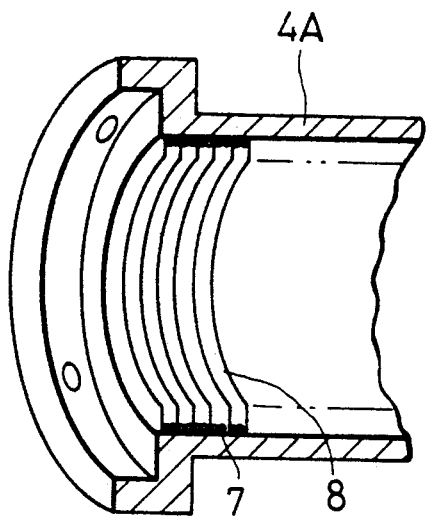
FIG. 4 shows a perspective view of a section of the DFB pipe.
Figure 5:
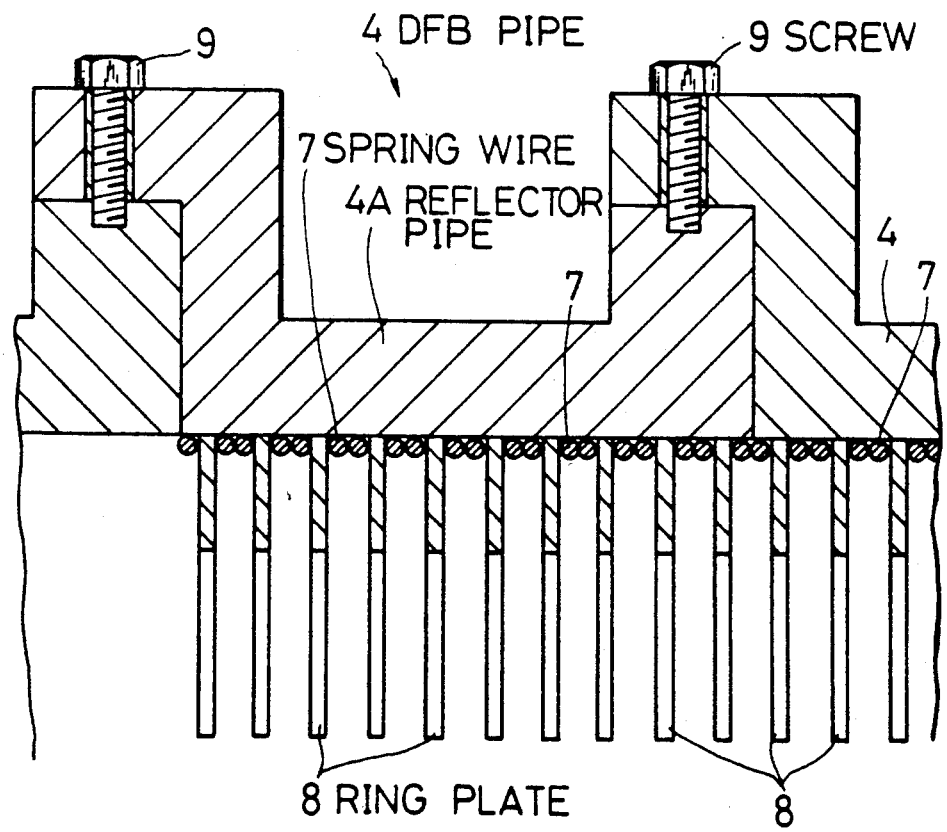
FIG. 5 shows an enlarged cross-sectional view of the DFB pipe.

FIG. 4 shows a perspective view of a section of DFB pipe 4, and FIG. 5 shows an enlarged cross-sectional view of DFB pipe 4.

As shown in the figures, each of the DFB pipes 4 are composed of reflector pipes 4A and a plurality of ring-formed plates (hereafter referred to as ring plates) 8. Ring plates 8 have their outer peripheries fitted to the inner periphery of reflector pipe 4A and are spaced apart from each other at a constant spacing d prescribed so that the alignment of ring plates provides the Bragg reflection of a electromagnetic wave having a desired wavelength λ. The ring plates are separated by means of annular spring wires 7, 1 mm in diameter. In the present embodiment, spacing d is 2.2 mm and the thickness of the ring plates is 0.2 mm. Thus widening of the spectral line width caused by the thickness is estimated to be 0.09 expressed in terms of spectral line width ratio $\Delta\lambda/\lambda = -\Delta f/f$.

In operation a HPL incident from the FEL source passes through input pipe 1, is expanded in input TP pipe 2 by diffraction, and the expanded electromagnetic waves further pass through stabilizer pipe 3. The electromagnetic waves, while guided through stabilizer pipe 3 of a uniform inner diameter, is stabilized in their transmission mode and the stabilized electromagnetic waves are incident into the DFB pipes 4. The electromagnetic waves, then diffracted in DFB pipes 4, are scattered forwards and backwards at regularly positioned ring plates. The forward scattered electromagnetic waves are transmitted along with the unscattered waves through stabilizer pipe 3 and output TP pipe 5, and are externally delivered from output pipe 6. The backward scattered electromagnetic waves, having a wavelength which satisfies the Bragg condition, returns through stabilizer pipe 3 and input TP pipe 2, and is fed back to the FEL through input pipe 1 in order to cause the stimulated emission in the FEL.

The Bragg reflection occurring in the DFB pipe is explained as analogous to the Bragg reflection of X-ray by a crystal lattice. Ring plates aligned spaced apart at a constant spacing are regarded as a one dimensional or linear lattice with a lattice constant of the constant spacing, where each of the ring plates corresponds to a lattice point of the crystal.

Figure 6:
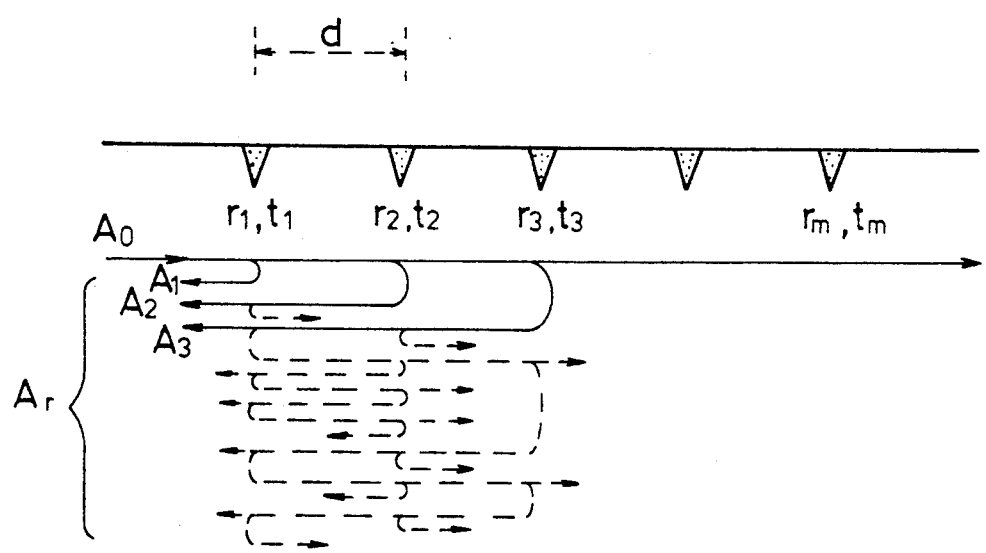
FIG 6. illustrates the principle of the Bragg reflection by the DFB pipe.

FIG. 6 illustrates the principle of the Bragg reflection by DFB pipes 4. In FIG. 6 the integers 1, 2, 3, —, M denote numbers for identifying the ring plates aligned in DFB pipe 4 or the lattice points in the linear lattice, and d denotes the lattice constant. Further, $r_j$, $t_j$ (j=1, 2, 3, —, M) represent the backward and forward scattering coefficients, respectively. In the figure, solid lines represent the incident HPL and scattered waves produced by primary backward scattering.

Broken lines represent multiple scattering. Since the probability of multiple scattering is very small, as is known from the theory of scattering, the contribution of multiple scattering to the Bragg reflection will be ignored.

The backward Bragg reflection is produced by interference of electromagnetic waves $A_1$, $A_2$, $A_3$, —, $A_M$ scattered backwards. The resultant backwards scattered electromagnetic wave $A_r$ is $$A_r = \Sigma A_k \qquad (9)$$
$$= \Sigma r_k A_o,$$

wherein $A_o$ represents the incident HPL and Σ represents vector sum ranging from k=1 to k=M. Equation (9) is easily calculated by taking into account the phase difference of the electromagnetic waves $A_k$ (k=1, 2, —, M) and by assuming that the scattering coefficients $r_k$ (k=1, 2, —, M) are all equal to r. If a phase difference of two electromagnetic waves scattered backwards at neighbouring lattice points is denoted by 2φ, the resultant scattered wave becomes $$A_r = \Sigma r A_o \exp\{2j(k-1)\phi\} \qquad (10)$$
$$= \exp\{-j(M-1)\phi\} \frac{\sin M\phi}{\sin \phi} A_o r.$$

Thus, the intensity of the resultant scattered wave, i.e., the intensity of the Bragg reflection is $$I_r = pA_r^* A_r = \frac{\sin^2 M\phi}{\sin^2 \phi} I_o, \qquad (11)$$

where p denotes the proportional constant and $I_o$ represents $pA_o^2 r^2$. Further, it is clear from the definition of φ that $$\phi = 2\pi(n_r/\lambda)d \qquad (12)$$
$$= 2\pi(f/c)d,$$

wherein f, $\lambda/n_r$ and c stand for the frequency, the wave length and velocity for refractive index $n_r$, respectively, of the electromagnetic wave (the refractive index is approximately 1 for the air in the DFB pipes).

The Bragg condition can be derived by equating the denominator of equation (11) to zero. Accordingly, $$\phi_{MAX} = \kappa\pi, \quad (13)$$

and $$I_{MAX} = I_o M^2, \quad (14)$$

where $I_{MAX}$ represents the maximum intensity of the Bragg reflection, $\phi_{MAX}$ represents the phase difference corresponding to the maximum intensity with integer K representing the order of the Bragg reflection. The Bragg condition for the frequency and the wavelength can be found from equations (12) an (13)

$$f_\kappa = \kappa\{c/(2d)\}, \quad (15)$$

$$\lambda_\kappa = 2d/\kappa, \quad (16)$$

where $f_K$ and $\lambda_K$ denote the frequency and wavelength of the Kth order Bragg reflection.

The value of $I_r$, represented by equation (11), vanishes when $\phi$ makes the numerator of the right side of equation (11) vanish, but does not make the denominator vanish. Thus, the frequencies at which the Bragg reflection vanishes are $$f_L = (L/M) \cdot (c/2d), \quad (17)$$

with positive integer $L = 1, 2, —, M-1, M+1, —$, i.e. with L=positive integer except KM (K is the positive integers above).

Figure 7:
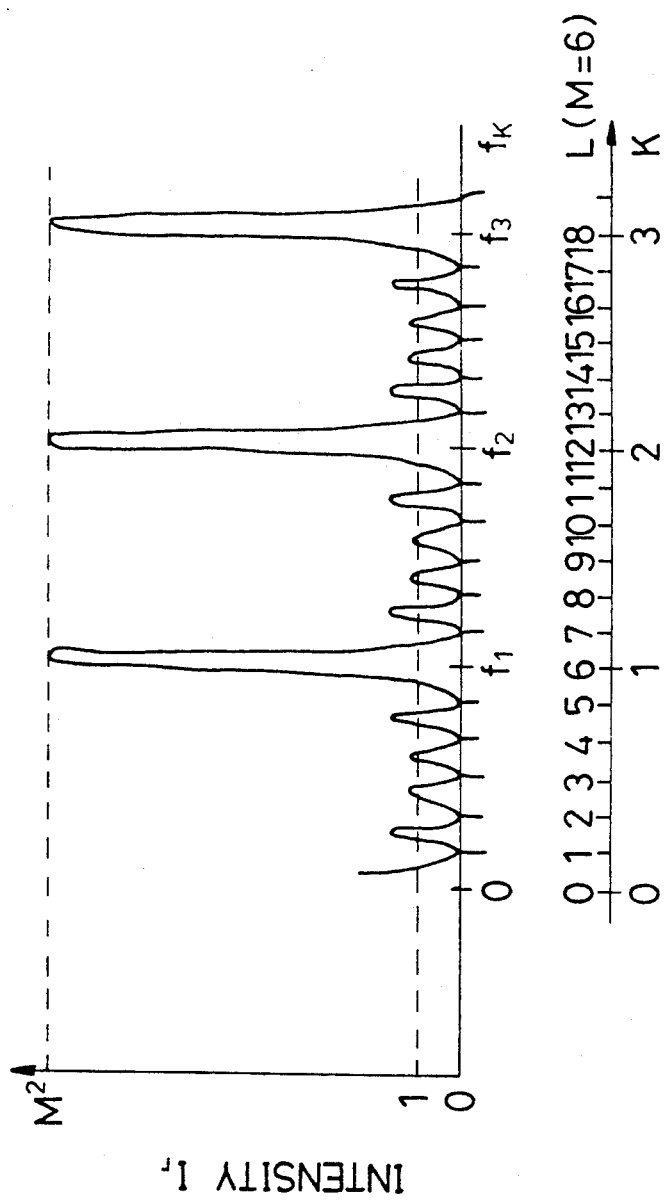
FIG. 7 represents a typical curve of $I_r$ plotted against the frequency of the incident high power laser.

FIG. 7 represents a typical curve of $I_r$ plotted against the frequency of the incident HPL, where M=6, and d=2. The ordinate of the figure is expressed in terms of $I_o$ taken as a unit. As seen from the figure, the intensity maxima of the Bragg reflection (the main peaks) exist at the frequencies $f_\kappa(\kappa = 1, 2, —)$ derived above, and $M-2(=4)$ subsidiary intensity maxima (the subsidiary peaks) exist at frequencies equally spaced between the frequencies for adjacent main peaks. The $M-1(=5)$ intensity zeros are present at frequencies $f_L$ disposed between the frequencies for two adjacent subsidiary peaks and also between the frequencies for main and subsidiary peaks. The height of the main peak is $M^2$, and that of the subsidiary peak is approximately 1. In the example shown in FIG. 7, lattice constant d is prescribed to be 2 mm, and thus frequency $f_1$ is approximately 75 GHz.

The spectral line width, expressed in terms of a half-value width of the main peak, is approximated to be approximately equal to the frequency difference corresponding to $\Delta L = 1$. Thus, $$\begin{aligned}\Delta f &= c/(2dM) \\ &= f_K/(KM).\end{aligned} \quad (18)$$

Accordingly, the spectral line width ratio becomes $$\Delta f/f_K = 1/(KM). \quad (19)$$

Figure 8:
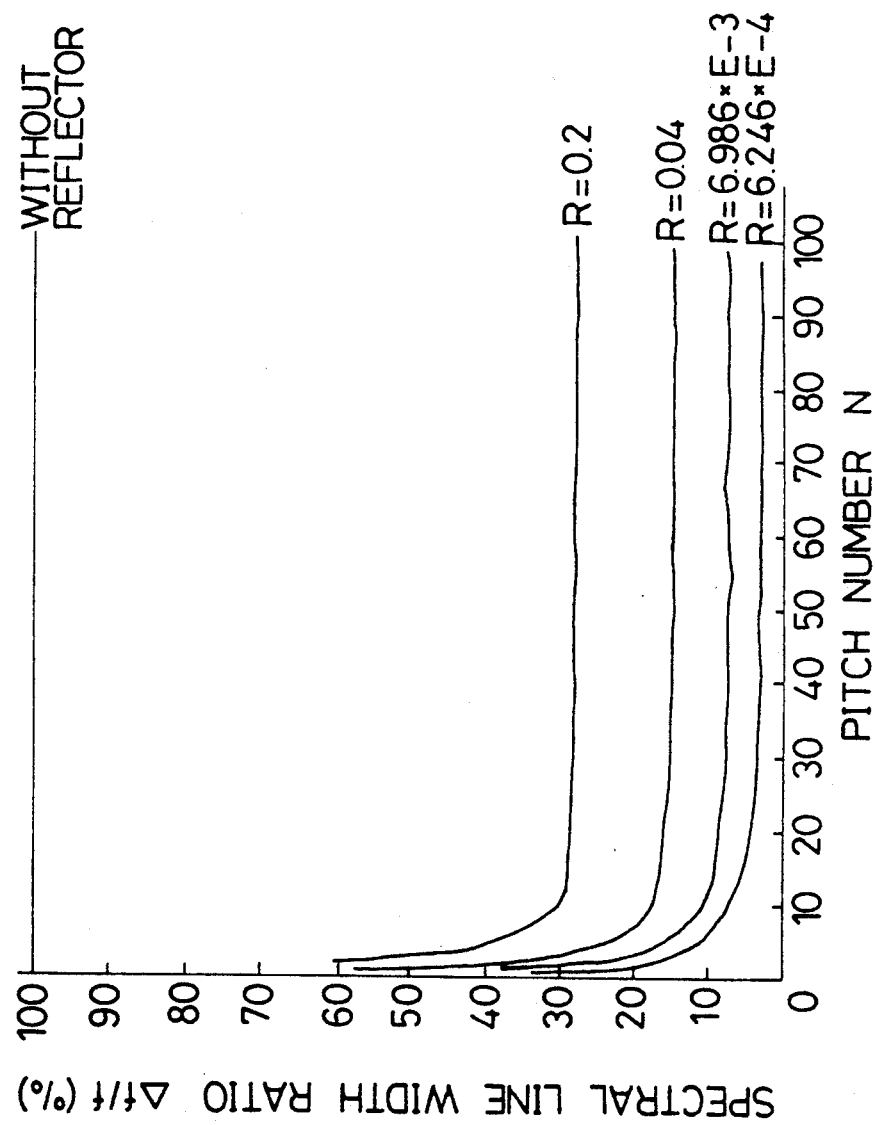
FIG. 8 represents the spectral line width ratio plotted against the pitch number.

Therefore, as integer M increases, the spectral line width of the Bragg reflection narrows and also the height of the main peak increases in comparison with the subsidiary peak (c.f. equation (14)). FIG. 8 represents the spectral line width ratio $\Delta f/f$ plotted against pitch number $N = M - 1$ for various values of a parameter R, where $R = r_o^2/Y_o^2$, $r_o$ and $Y_o$ are inner and outer radii of the ring plate 8, respectively, and thus R represents ratio of the flux of the electromagnetic wave incident into the central hole of the ring plate to the total flux incident to the DFB pipe 4. The figure implies that the spectral line width ratio $\Delta f/f$ varies approximately inverse-proportionally to $M = N + 1$ for $N \leq 3$ and then remains at a substantially constant residual value, and that the residual value increases as parameter R increases. (The reason for the increase in the residual value is not clear. However, one of the possible reasons might be that, as R increases, probability of an oblique incidence of the light wave to the DFB pipe 4 increases, which allows a wide deviation in phase angle, causing frequency deviation in the backward Bragg reflection.)

Figure 9:
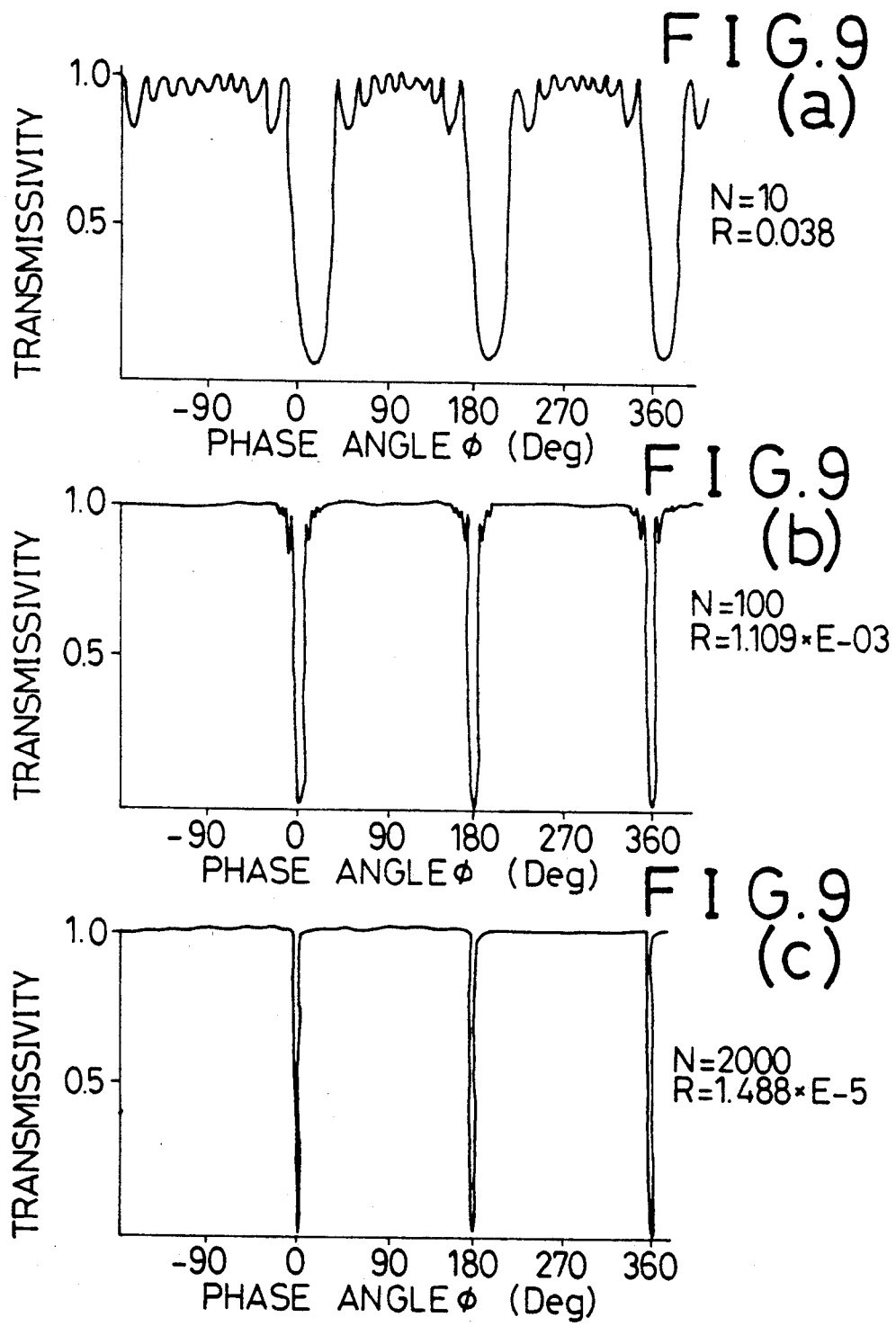
FIGS. 9(a)–9(c) show transmissivity characteristic plotted against the phase angle.

FIG. 9 shows the transmissivity characteristics plotted against the phase angle $\phi$ calculated by means of simulation. Here transmissivity is a ratio of the intensity of the electromagnetic wave delivered from output pipe 6 to the intensity of the electromagnetic wave incident into input pipe 1. Sharp dips are produced at angles corresponding to the main peaks of the backward Bragg reflection. FIGS. 9, (a), (b) and (c) illustrate the tendencies that the dip tends to be narrower and the heights of the subsidiary peaks tend to be negligibly smaller as N or M increases. According to the simulation calculation, the line width ratio for the first order reflection $f_1$ becomes approximately 1.75%, when parameter R=0.06% and pitch number N=100 (absorptance $\Lambda = 0.2 + 20j$), and becomes approximately 1.05%, where R=0.06% and N=160.

Figure 10:
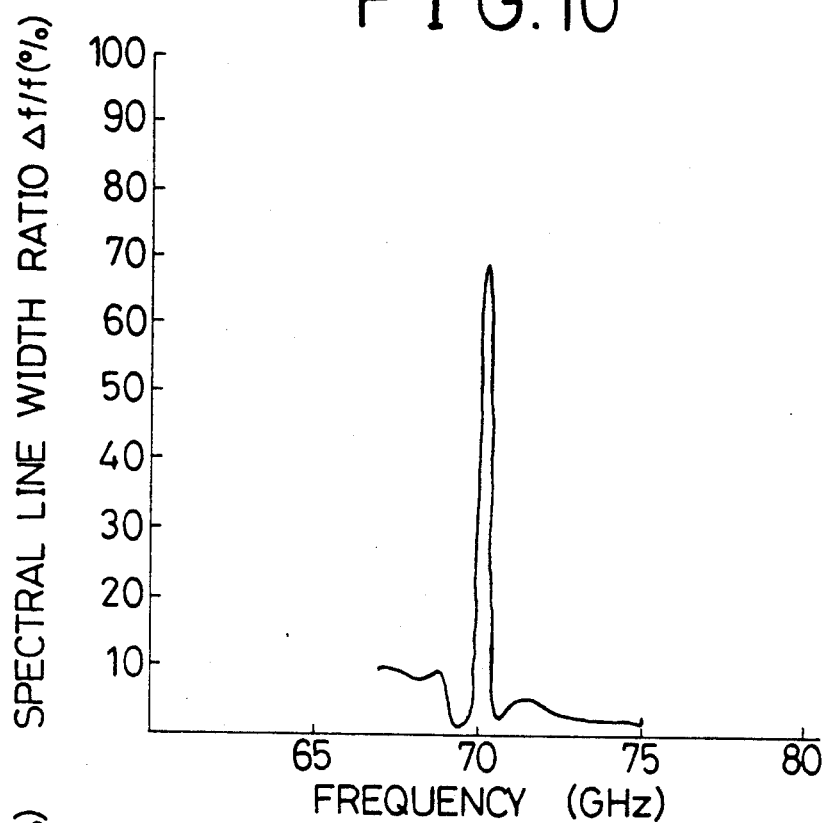
FIG. 10 represents the spectral line width ratio plotted against the frequency.
Figure 11:
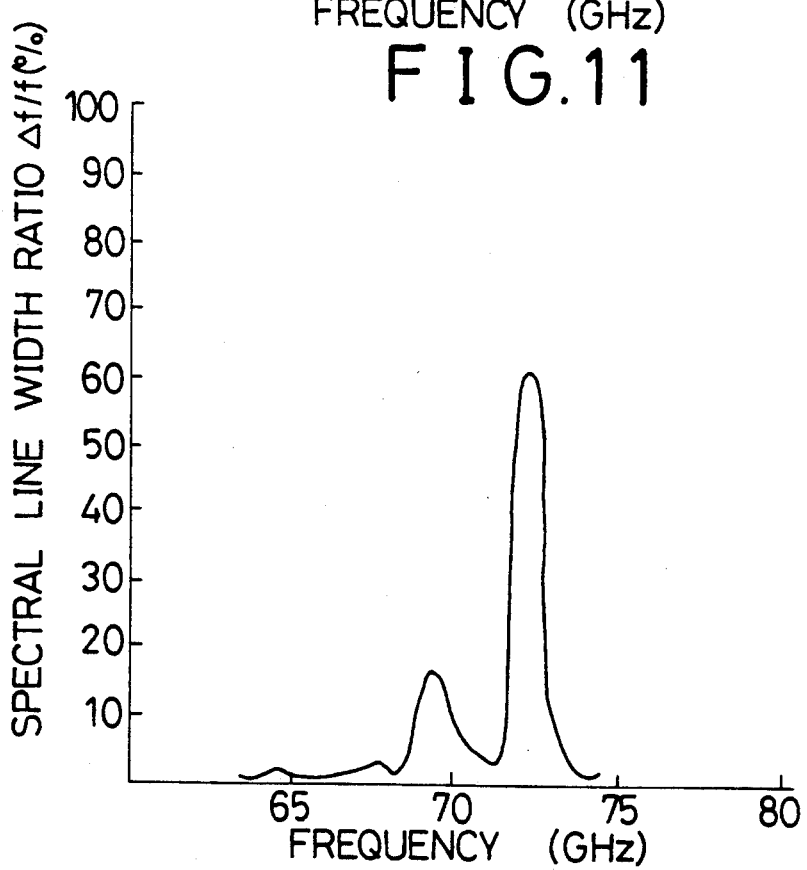
FIG. 11 represents the spectral line width ratio plotted against the frequency.
Figure 12:
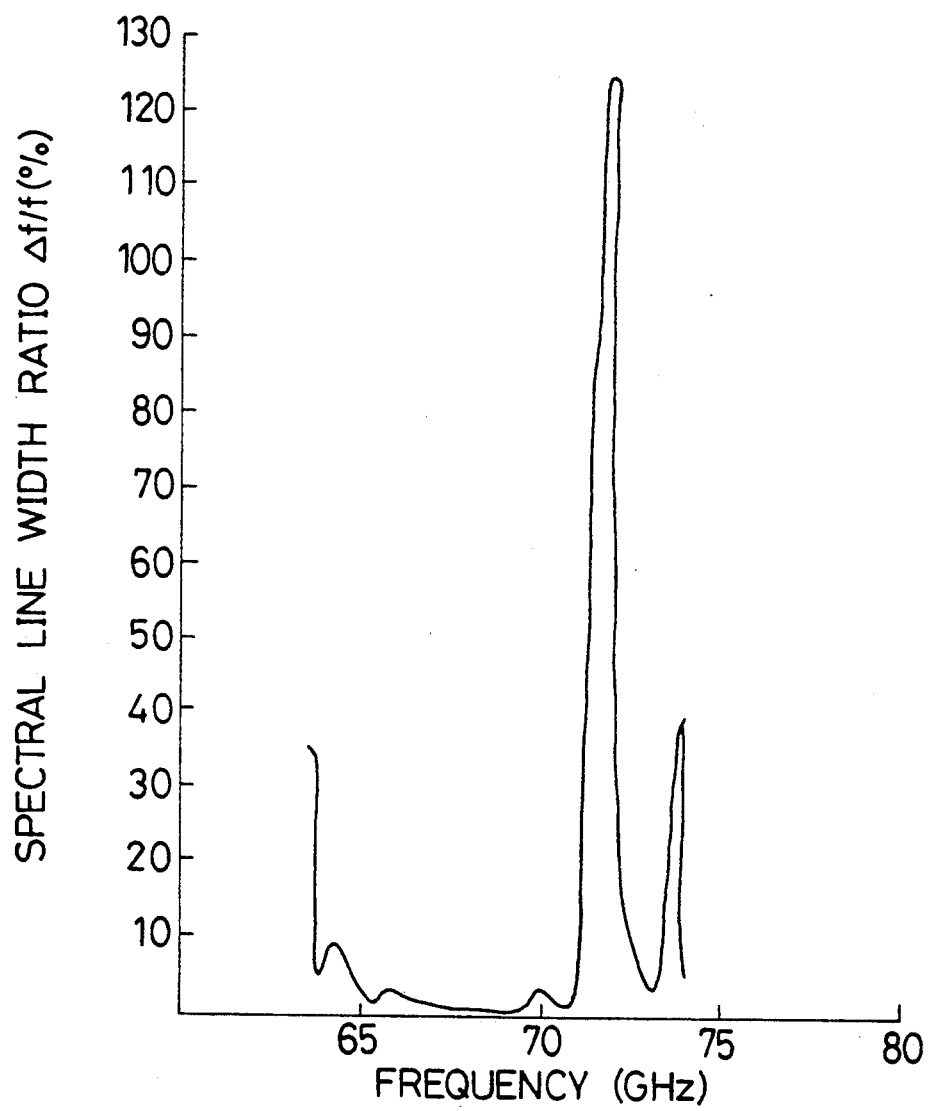
FIG. 12 represents the spectral line width ratio plotted against the frequency.

FIGS. 10, 11 and 12 illustrate the effect of DFB pipes 4, representing the spectral line width ratio $\Delta f/f$ plotted against the frequency (GHz). In these embodiments, the HPL used is a millimeter wave, 70 GHz (typ) in frequency and 100 mW (typ) in power, supplied from a laser source operated at 2500 Volt (typ). The parameters of the DFB pipes used in these embodiments are R=0.27, N=40 in FIG. 20
R=0.27, N=10 in FIG. 11
R=0.59, N=50 in FIG. 20.

In comparison with FIG. 9, taking into account $\phi = 2\pi(f/c)d$, it is seen that the DFB pipes act as band-stop filters which reject very narrow bands $\Delta f$ of the Bragg reflection frequencies as shown in FIGS. 10-12.

As described above, since the DFB pipes of the present invention are provided with a plurality of ring plates spaced at intervals prescribed for providing the Bragg reflection, the present invention has an advantage in that it is capable of narrowing a spectral line width of a microwave and a far-infrared wave emitted from a high power laser source.

It is to be understood, however, that although characteristics and advantages of the present invention have been set forth in the foregoing description, the disclosure is illustrative only, and changes may be made in shape, size, and arrangement of parts within the scope of the appended claims.

What we claim is:

1. In an apparatus for providing Bragg reflection of microwaves and far-infrared waves, a Bragg reflector provided with a reflector part, the reflector part having at least one reflector element, each reflector element having a longitudinal axis and comprising
  one pipe, and a plurality of ring-formed plates being non-integral with said one pipe, said plurality of ring-formed plates having the same inner diameter and having outer peripheries fitted to the inner periphery of the one pipe, the plurality of ring-formed plates being adjustably spaced apart from each other so as to enable variation of a Bragg reflectivity of said Bragg reflector, thereby allowing selection of a desired wavelength in microwave and far-infrared regions.

2. A Bragg reflector as claimed in claim 1, wherein the ring-formed plates are made of heat-resistant metal.

3. A Bragg reflector as claimed in claim 1, wherein the reflector part comprises a plurality of reflector elements, said reflector elements being coaxially interconnected mechanically by screws.

4. A Bragg reflector as claimed in claim 1, further comprising an input part having a longitudinal axis and connected coaxially to the reflector part, the input part including an input pipe through which an incident beam of a microwave or far-infrared wave is introduced into the Bragg reflector.

5. A Bragg reflector as claimed in claim 4, wherein the one pipe and the input pipe have a circular cross-section, and wherein, when the inner diameters of the one pipe and the input pipe are different from each other, the input part further includes a tapered pipe and a stabilizer pipe, the tapered pipe having a tapered inside wall, one end of which has an inner diameter which is equal to that of the input pipe and is connected to the input pipe, and the other end of which has an inner diameter which is equal to that of the stabilizer pipe and is connected to the stabilizer pipe, the stabilizer pipe having an inner diameter which is equal to that of the one pipe and is connected between the one pipe and the tapered pipe so as to stabilize an unstable waveguide mode of the incident beam caused by reflection on the tapered inside wall of the tapered pipe.

6. A Bragg reflector as claimed in claim 4, further comprising an output part having a longitudinal axis and connected coaxially to the reflector part, the output part including an output pipe through which the incident beam and a Bragg-reflected beam exit from the Bragg reflector, said Bragg-reflected beam being Bragg-reflected in a direction that is forward with respect to the direction of the incident beam.

7. A Bragg reflector as claimed in claim 6, wherein the input part, the reflector part, and the output part are connected mechanically by screws.

8. A free electron laser, comprising a free electron laser source, driven in a Raman regime, and the Bragg reflector recited in claim 6, wherein a free electron laser beam produced by the free electron laser source is supplied to the Bragg reflector through an output window of the free electron laser source and the input pipe of the Bragg reflector, and a Bragg-reflected beam produced by Bragg reflection by the Bragg reflector is fed back through the input pipe to the free electron laser source, said Bragg reflection being performed in a direction that is opposite a direction of the free electron laser beam supplied to the Bragg reflector.

* * * * *

UNITED STATES PATENT AND TRADEMARK OFFICE
CERTIFICATE OF CORRECTION

PATENT NO. : 5,291,512
DATED : March 1, 1994
INVENTOR(S) : Yoshinori Suzuki

It is certified that error appears in the above-indentified patent and that said Letters Patent is hereby corrected as shown below:

Col. 9, line 12, after "the", insert --plurality of--.

Signed and Sealed this

Fourth Day of October, 1994

Attest:

BRUCE LEHMAN

*Attesting Officer*  *Commissioner of Patents and Trademarks*